United States Patent
Ahdoot

(10) Patent No.: US 9,923,414 B2
(45) Date of Patent: Mar. 20, 2018

(54) SYSTEM FOR REDUNDANT POWER SUPPLY TO A DATA CENTER

(71) Applicant: Eliot Ahdoot, Dollard des Ormeaux (CA)

(72) Inventor: Eliot Ahdoot, Dollard des Ormeaux (CA)

(*) Notice: Subject to any disclaimer, the term of this patent is extended or adjusted under 35 U.S.C. 154(b) by 211 days.

(21) Appl. No.: 15/015,060

(22) Filed: Feb. 3, 2016

(65) Prior Publication Data

US 2017/0222476 A1  Aug. 3, 2017

(51) Int. Cl.
*H02J 9/06* (2006.01)

(52) U.S. Cl.
CPC ................... *H02J 9/06* (2013.01)

(58) Field of Classification Search
CPC ........................................ H02J 9/06
USPC ........................... 307/64, 65, 66, 67
See application file for complete search history.

(56) References Cited

U.S. PATENT DOCUMENTS

| | | |
|---|---|---|
| 6,356,470 B1 | 3/2002 | Sadler |
| 6,430,068 B1 | 8/2002 | Sadler et al. |
| 6,654,265 B2 | 11/2003 | Sadler et al. |
| 7,721,122 B2 | 5/2010 | Brundridge |
| 8,067,857 B2 | 11/2011 | Humprey et al. |
| 8,294,297 B2 | 10/2012 | Linkhart et al. |
| 8,963,371 B2 | 2/2015 | Kinnard |
| 9,276,405 B2 | 3/2016 | Lew et al. |
| 2002/0122322 A1 | 9/2002 | Oughon |
| 2005/0200205 A1 | 9/2005 | Winn et al. |
| 2012/0181869 A1* | 7/2012 | Chapel ............ H02J 9/06 307/64 |
| 2013/0187469 A1 | 7/2013 | Liang et al. |
| 2013/0293017 A1* | 11/2013 | Englert ........... H02J 9/04 307/65 |
| 2015/0234440 A1 | 8/2015 | Gardner et al. |
| 2015/0331467 A1 | 11/2015 | Kaplan |

(Continued)

FOREIGN PATENT DOCUMENTS

| | | |
|---|---|---|
| CN | 102368631 | 3/2012 |
| WO | WO 2014146776 | 9/2014 |
| WO | WO 2015091504 | 6/2015 |

OTHER PUBLICATIONS

PCT/International Search Report (ISR)—PCT/CA2017/050122 (PCT/ISA/220)—dated Apr. 12, 2017—4 pages, Agarwal, Rajiv.

*Primary Examiner* — John Poos

(74) *Attorney, Agent, or Firm* — Benoit & Cote, Inc.; C. Marc Benoit

(57) ABSTRACT

There is described a circuit to supply electric power to N electrical panels. The circuit comprises N+1 blockbars, each one of the blockbars being for connection to an automatic transfer switch (ATS) of a power source, each one of the blockbars being connected to at least two other ones of the N+1 blockbars via a segregating switchgear. The circuit further comprises N+1 UPS units, each one of the UPS units being for connection to a dedicated one of the blockbars via a dedicated switchgear. The circuit further comprises 2N power outputs, each one of the N electrical panels being connected to 2 of the 2N power outputs, each one of the 2N power outputs being connected to 2 of the N+1 UPS units. This configuration allows for N+1 redundancy at the generator and UPS levels to feed the electrical distribution with 2N redundancy.

11 Claims, 4 Drawing Sheets

(56) References Cited

U.S. PATENT DOCUMENTS

2015/0378408 A1 12/2015 Kaplan
2015/0380968 A1 12/2015 Lee

* cited by examiner

SYSTEM FOR REDUNDANT POWER SUPPLY TO A DATA CENTER

BACKGROUND (a) Field

The subject matter disclosed generally relates to circuitry for electric supply to data centers. More specifically, it relates to circuit architecture providing redundant electric supply to data centers.

(b) Related Prior Art

Data centers consume considerably large amounts of electric power. The servers making up a data center need to be constantly supplied in electric power, i.e., in an uninterrupted manner. To a lesser extent, the same holds for other components such as fans and air conditioning which contribute to the functioning of the data center.

Redundancy is usually provided by doubling the equipment to ensure the uninterrupted operation of the data center. However, doubling the equipment is costly. This disadvantage is emphasized by the fact that redundant equipment is usually used in emergency cases only, i.e., it remains almost unused. In this industrial environment, allocating capital to power-generating equipment that occupies space, requires maintenance and otherwise has a very low capacity factor is undesirable.

There is therefore a need for redundancy in electricity supply that does not require capital-intensive equipment.

SUMMARY

According to an embodiment, there is provided a system for redundantly supplying power to electrical panels, the system comprising:
- N+1 input electrical connections to power sources for receiving power therefrom;
- N+1 UPS units, each one of the N+1 UPS units having an electrical connection to each one of the N+1 input electrical connections; and
- N electrical panels to which power is supplied, each one of the electrical panels having electrical connections to a combination of two UPS units, whereby each one of the N+1 UPS units has at least N electrical connections to the electrical panels.

According to another embodiment, each one of the UPS units has a dedicated one of the input electrical connections, the electrical connection between each one of the UPS units and the dedicated one of the input electrical connections comprising a switchgear having a first current rating.

According to another embodiment, the electrical connection between each one of the UPS units and the N+1 input electrical connections others than the dedicated one comprises a switchgear having a second current rating greater than the first current rating.

According to another embodiment, there is further provided a utility electrical panel having an electrical connection to each one of the N+1 input electrical connections, the utility electrical panel having two dedicated input electrical connections, the electrical connection between the utility electrical panel and the two dedicated input electrical connections comprising a switchgear having a first current rating.

According to another embodiment, the electrical connection between the UPS units and the input electrical connections comprises a blockbar.

According to another embodiment, each one of the input electrical connections comprises an automatic transfer switch (ATS).

In another aspect of the invention, there is provided a power supply system for a data center, the power supply system comprising:
- N+1 inputs for receiving power from a bank of N+1 power sources;
- a bank of N+1 UPS units, each one having an electrical connection to each one of the N+1 inputs and being protected therefrom by a dedicated switchgear;
- 2N power outputs to supply the data center, each one of the 2N power outputs being connected to two of the N+1 UPS units; and
- segregating switchgears, located such that any electrical path between the dedicated switchgear of two N+1 UPS units comprises at least one of the segregating switchgears.

According to another embodiment, each dedicated switchgear has a first current rating, each segregating switchgear having a second current rating greater than the first current rating.

According to another embodiment, the electrical connection between the UPS units and the inputs comprises a blockbar.

According to another embodiment, each one of the inputs comprises an automatic transfer switch (ATS).

According to another embodiment, there is further provided a utility electrical panel having an electrical connection to each one of the N+1 inputs, the utility electrical panel having two dedicated inputs, the electrical connection between the utility electrical panel and the two dedicated inputs comprising a switchgear having a first current rating.

In another aspect of the invention, there is provided circuit to supply electric power to N electrical panels, the circuit comprising:
- N+1 blockbars, each one of the blockbars being for connection to an automatic transfer switch (ATS) of a power source, each one of the blockbars being connected to at least two other ones of the N+1 blockbars via a segregating switchgear;
- N+1 UPS units, each one of the UPS units being for connection to a dedicated one of the blockbars via a dedicated switchgear; and
- 2N power outputs, each one of the N electrical panels being connected to 2 of the 2N power outputs, each one of the 2N power outputs being connected to 2 of the N+1 UPS units.

According to another embodiment, each dedicated switchgear has a first current rating, each segregating switchgear having a second current rating greater than the first current rating.

According to another embodiment, there is further provided a utility electrical panel having an electrical connection to each one of the N+1 blockbars, the utility electrical panel having two dedicated blockbars, the electrical connection between the utility electrical panel and the two dedicated blockbars comprising a switchgear having a first current rating.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
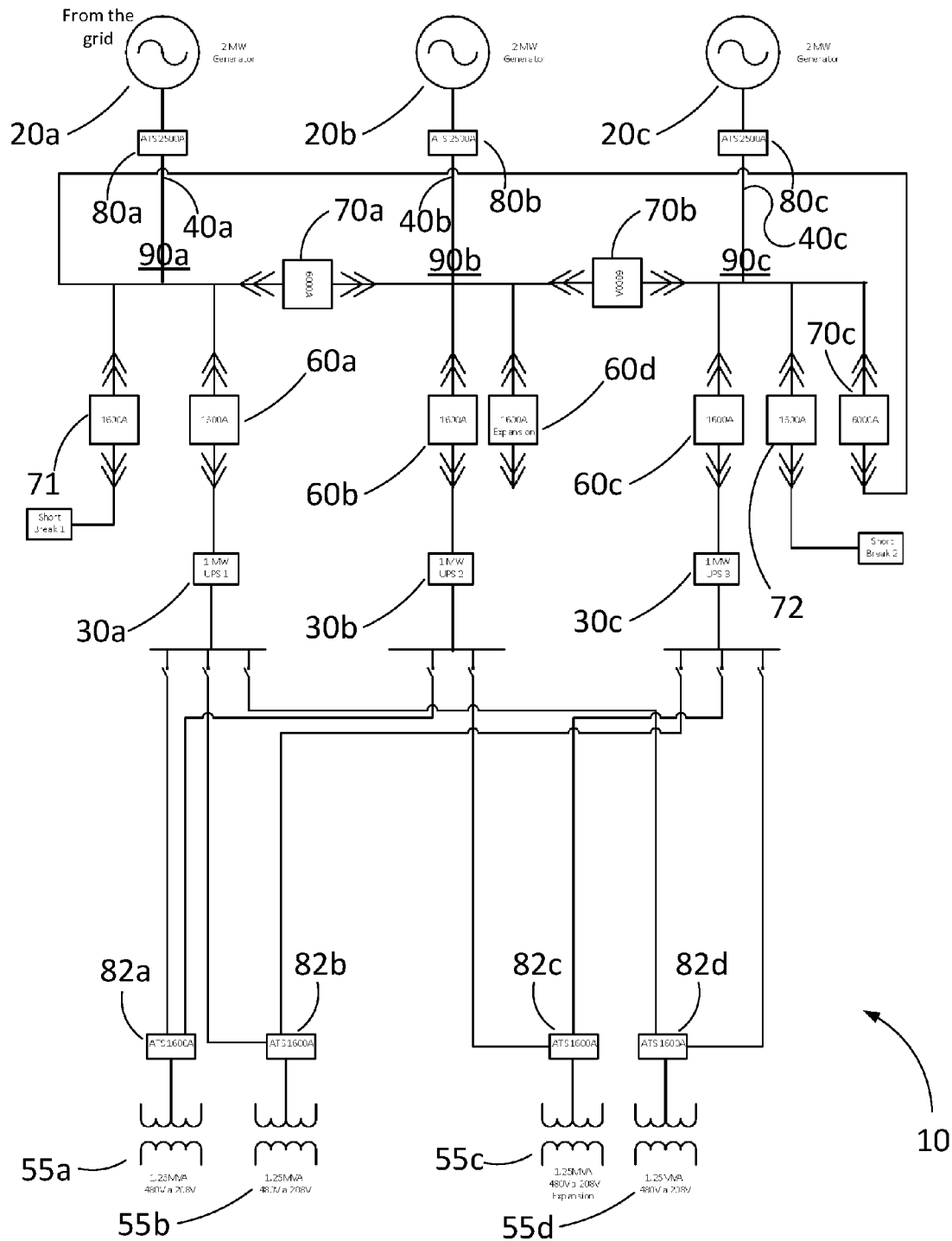
FIG. 1 is a single-line diagram illustrating the system for redundantly supplying power to electrical panels, according to an embodiment.

There is described a system 10, shown in FIG. 1, providing redundant electric supply to a load such as a data center. The configuration described below allows for N+1 redundancy at the generator and UPS levels to feed the electrical distribution with 2N redundancy.

The system 10 comprises a bank of power sources 20a, 20b, 20c, aka generators, generating electric power for the circuit, a bank of UPS units 30a, 30b, 30c and electrical panels 50a, 50b receiving the electric power.

Figure 4:
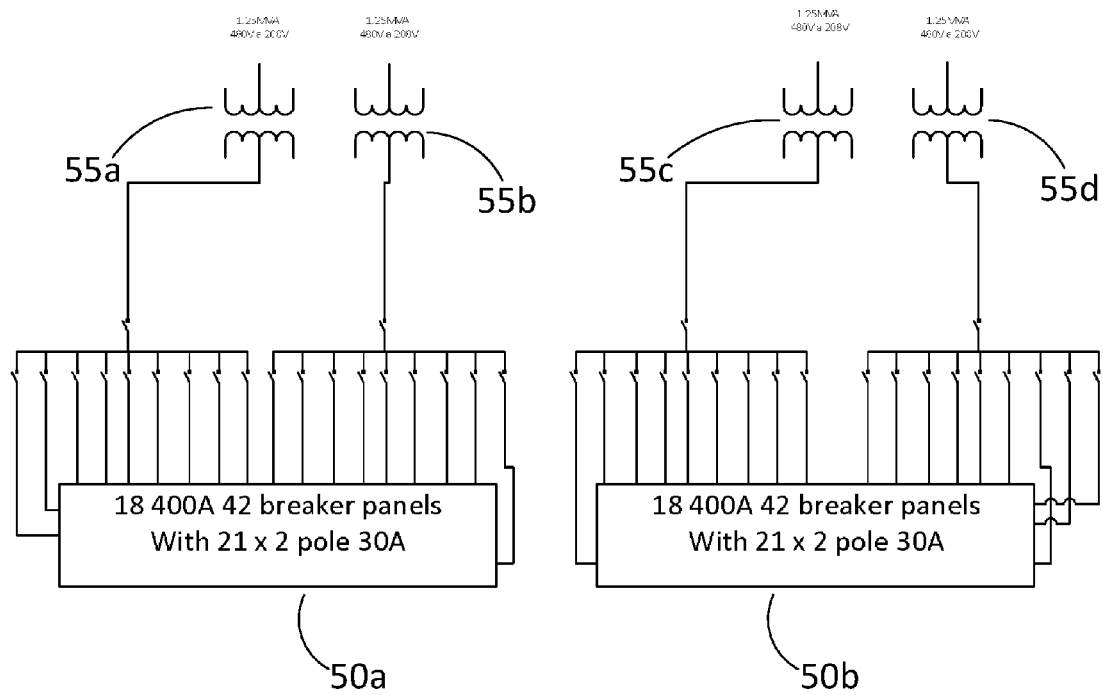
FIG. 4 is a single-line diagram illustrating the electrical panels, according to an embodiment.

At the electrical distribution side, the system 10 usually comprises 2N transformers 55a, 55b, 55c, 55d directly connected to N electrical panels 50a, 50b (see FIG. 4). The N electrical panels 50a, 50b are fed in a redundant manner by N+1 UPS units 30a, 30b, 30c. The electric power is provided to the N+1 UPS units 30a, 30b, 30c by N+1 power sources 20a, 20b, 20c.

Therefore, the system described herein displays N+1 redundancy at the generator and UPS levels to feed the electrical distribution with 2N redundancy over the N loads.

As mentioned above, the system 10 comprises a plurality of UPS units 30a, 30b, 30c. A UPS is an uninterruptible power supply (aka uninterruptible power source), an electrical apparatus that provides substantially uninterruptible power to a load when one of its power sources fails. Usually, in existing systems, the UPS is supplied by a main power source. If the main power source fails, a battery or any equivalent thereof (e.g., a supercapacitor) can supply the required electric power. The battery or equivalent, usually in a passive mode, needs to be able to start fast when the main power undergoes a failure so that the transition from one power source to another one is almost seamless.

The UPS units 30a, 30b, 30c used in this system do not rely on the presence of a battery to provide emergency power in an uninterruptible fashion. The UPS units 30a, 30b, 30c used in this system rather rely on the connection to more than one of the power sources 20a, 20b, 20c that are continuously supplying the UPS units 30a, 30b, 30c in electric power.

Instead of relying on a main active power source and a secondary passive power source that takes over when there is a failure of the main active power source, as usually done in existing systems, the UPS units 30a, 30b, 30c use the power from all power sources 20a, 20b, 20c, which remain active most of the time.

According to an embodiment, there may still be batteries (not shown) to provide emergency power when needed. However, the system 10 contemplated herein renders these batteries superfluous to provide the desired redundancy.

Power sources 20a, 20b, 20c can be the power grid 15, on-site generators (known to exist in various form factors) and the like. Each power source should be independent from the other ones so that failures are independent events.

According to an embodiment, power sources 20a, 20b, 20c are connected to the system 10 at a respective one of the input connections 40a, 40b, 40c, where automatic transfer switches 80a, 80b, 80c (ATS) are provided. Each ATS (80a, 80b, 80c) is dedicated to one of the power sources (20a, 20b, 20c, respectively). An ATS is a transfer switch that detects when a power source is needed (i.e., detects a loss of power in the system 10) and electrically closes the circuit to allow its dedicated power source to supply power to the system 10. When the power source is not needed, the associated ATS from the ATSs 80a, 80b, 80c can open the circuit to remove connection to its power source 20a, 20b, 20c to the system 10. According to an embodiment, the ATS is the device that detects the need to start a power source 20a, 20b, 20c and that instructs (i.e., triggers) the power source 20a, 20b, 20c to start.

According to an embodiment, ATSs 82a, 82b, 82c are also provided at the transformers 55a, 55b, 55c, 55d. For each transformer (55a, 55b, 55c, 55d), a dedicated ATS (82a, 82b, 82c, 82d) is provided. The ATS acts to open/close the circuit when power needs to be supplied to the panel from one of the transformers 55a, 55b, 55c, 55d. Each ATS-transformer pair is to be connected to an electrical panel; each ATS-transformer pair can thus be considered as a power output for the system 10.

Electrical connections between parts of the circuit are known to exist in various types and shapes. In practice, the fact that high currents are involved in the system is reflected by the use of electric busbars for electrical conduction and block bars for connections. Electric busbars are robust, can withstand high currents and are widely used inside industrial-size electrical enclosures.

According to an embodiment, there is a mechanism for isolating power sources 20a, 20b, 20c and UPS units 30. For example, if a defect in synchronization (e.g., dissimilar frequency, phases not aligned properly, etc.) between power sources occurs, the electrical paths from these power sources 20 should be isolated; these power sources 20 should have no electrical connection therebetween so that no part of the circuit simultaneously receives power from two un-synchronized sources. Each one of the UPS units 30a, 30b, 30c has its dedicated one of the inputs 40a, 40b, 40c (aka input electrical connections 40a, 40b, 40c). If isolation needs to be performed, the electrical connection between one of the UPS units 30a, 30b, 30c and its dedicated input 40a, 40b, or 40c will be the only one preserved; connections between the UPS units 30a, 30b, 30c and non-dedicated inputs 40a, 40b, 40c will be removed. This action will isolate power source/UPS unit pairs from other pairs, usually for safety purposes.

This can be formalized as follows. The electrical connections between the UPS units 30a, 30b, 30c and the input electrical connections 40a, 40b, 40c involve a plurality of different UPS-input paths. The dedicated UPS-input path is isolatable, i.e., all dedicated UPS-input paths can be segregated and work in parallel to each other. Non-dedicated UPS-input paths can be electrically opened (i.e., no current can pass) by a breaker (the switchgear unit described below) to prevent any current to exist along these paths when dedicated UPS-input paths need to be segregated.

For example, in FIG. 1, the direct paths between UPS unit 30a and the input 40a is a dedicated UPS-input path, while the direct path from UPS unit 30a to the inputs 40b and 40c are non-dedicated UPS-input paths.

According to an embodiment, UPS units 30a, 30b, 30c can be individually protected using dedicated switchgear units 60a, 60b, 60c, 60d, and segregation of isolatable dedicated UPS-input paths is performed using segregating switchgear units 70a, 70b, 70c.

A switchgear unit is an apparatus that can perform the function of a circuit breaker. In addition, a switchgear unit performs other functions such as measuring current. Other functions may be added to the switchgear unit depending on the sophistication of the unit. The switchgear unit is programmable; it can break the circuit according to predefined rules. When the conditions programmed in the switchgear unit are met, the switchgear unit breaks the circuit. Usually, breaking is performed for protection purposes, e.g., to protect equipment from too high currents.

A switchgear unit is usually characterized by a current rating (in amperes), which can be defined in various ways but is usually the maximum current that the switchgear can handle before breaking the circuit.

Dedicated switchgear units 60a, 60b, 60c, 60d (aka first switchgear units) for each UPS unit are located on the dedicated UPS-input path of each UPS unit. Each dedicated switchgear unit 60a, 60b, 60c, 60d serves as a circuit breaker for each of the UPS units 30a, 30b, 30c to which it is dedicated. For example, in FIG. 1, the dedicated switchgear unit 60a is dedicated to the UPS unit 30a. Dedicated switchgear units 60a, 60b, 60c, 60d have a current rating for protecting the UPS units 30a, 30b, 30c. This current rating is defined as the first current rating. In an example, the first current rating is about 1,600 A.

A given one of the UPS units 30a, 30b, 30c should not be electrically connected to its dedicated power source input without encountering a dedicated switchgear unit on the path between these two locations in the circuit. Additionally, it is preferable if the dedicated switchgear unit of a given UPS unit is located on the path(s) between the given UPS unit and neighboring segregating switchgear unit(s), as illustrated in FIG. 1 where the dedicated switchgear unit is located close to its UPS unit to protect it from perturbations occurring on every path.

Segregating switchgear units 70a, 70b, 70c (aka second switchgear units) are located on each one of the non-dedicated paths between UPS units and inputs. The purpose of the segregating switchgear units is to isolate a dedicated path from other paths. A given one of the UPS units 30a, 30b, 30c should not be electrically connected to a non-dedicated one of the power source inputs 40a, 40b, 40c without encountering a segregating switchgear unit on the path between these two locations in the circuit.

The segregating switchgear units have a current rating for isolating dedicated UPS-input paths. To avoid confusion, this current rating is defined as the second current rating. In an example, the second current rating is about 6,000 A.

According to an embodiment, the second current rating is greater than the first current rating. For a given UPS-input pair, the dedicated path defined between the UPS unit and its dedicated input connection should be protected by a segregating switchgear unit with a second current rating sufficient to protect the given UPS unit of UPS units 30a, 30b, 30c (e.g., UPS unit 30a) from the maximum sum of the currents from all other power sources 20a, 20b, 20c (other than its dedicated one, e.g., power sources 20b and 20c).

In practice, as mentioned above, blockbars can be used for connections between components of the circuit of system 10. In the context of FIG. 1, where there are three UPS units 30a, 30b, 30c and three power inputs 40a, 40b, 40c, there would be three blockbars, e.g., blockbars 90a, 90b and 90c. For example, blockbar 90a would be connected to the ATS 80a and to the dedicated switchgear 60a of the UPS unit 30a. Blockbars 90a, 90b, 90c would also be connected together to form the multiple electrical paths. However, between blockbars 90a, 90b, 90c, there is provided a segregating switchgear unit 70a, 70b, 70c for enabling segregation on blockbars if or when needed. For example, between blockbars 90a and 90b, there is provided segregating switchgear 70a; between blockbars 90b and 90c, there is provided segregating switchgear 70b; and between blockbars 90c and 90a, there is provided segregating switchgear 70c.

Figure 2:
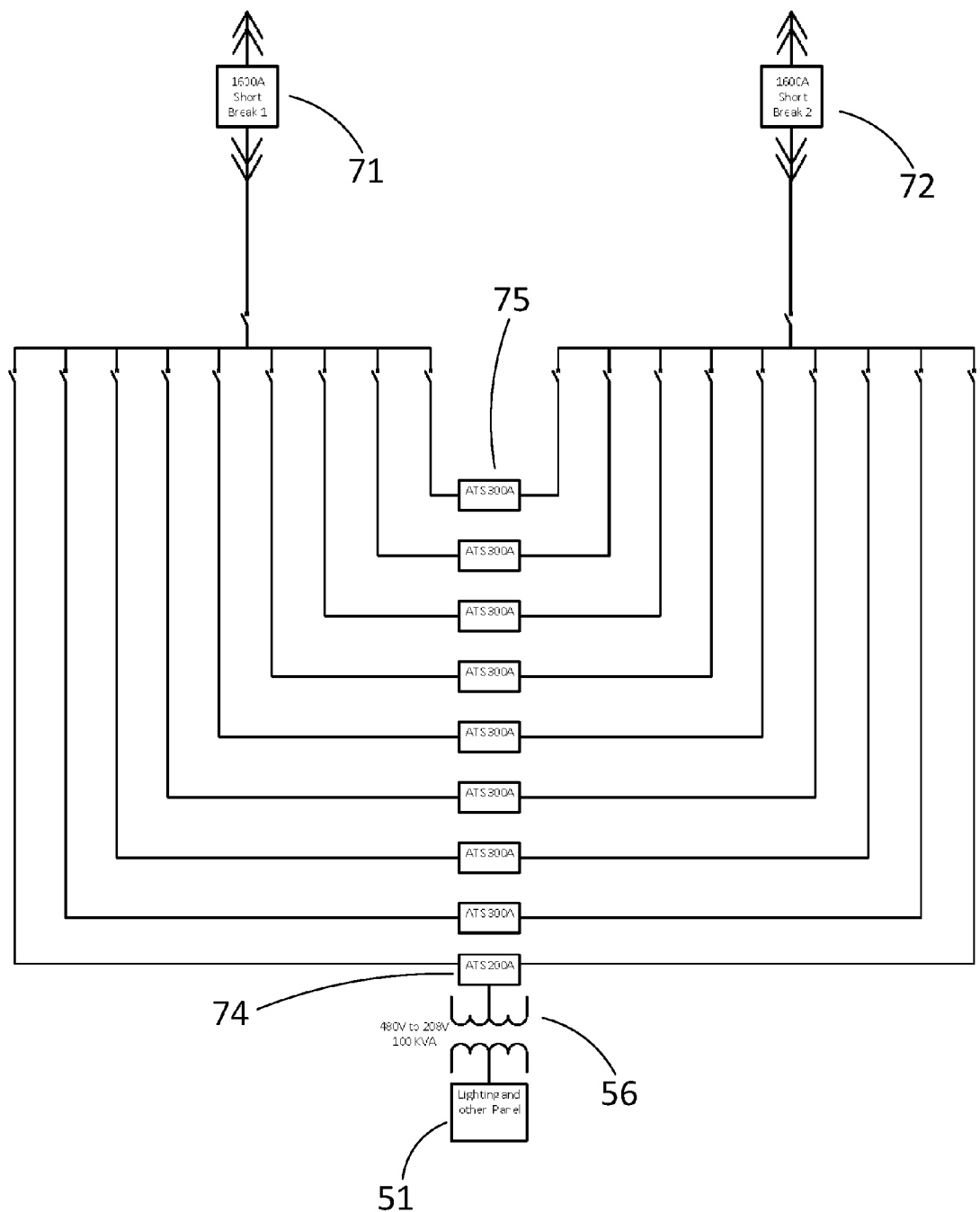
FIG. 2 is a single-line diagram illustrating the subsystem for redundantly supplying power to lighting and other building-related functions, according to an embodiment.

According to an embodiment, there is further provided a utility panel 51. The utility panel 51 is the electrical panel used for lighting, and other building- or room-related electric needs. As shown in FIG. 2, the utility panel 51 is provided in a parallel architecture with a plurality of ATSs 75, i.e., the utility panel 51 is connected at both ends to a first short break 71 and a second short break 72, and a plurality of ATSs 75 are connected to the first short break 71 and the second short break 72 in a similar fashion. More precisely, the utility panel 51 is connected to the first short break and the second short break via a transformer 56 and an ATS 74 than has a current rating lower than the current rating of the other ATSs 75 provided in parallel. In the embodiment illustrated in FIG. 1, the first short break 71 and the second short break 72 are switchgear units which are dedicated to the connection with the power source 20a and power source 20c, respectively, both power sources being able to supply power to the utility panel 51, thereby providing redundancy.

According to an embodiment, an additional dedicated switchgear unit 60d is provided to enable extension of the system.

Figure 3:
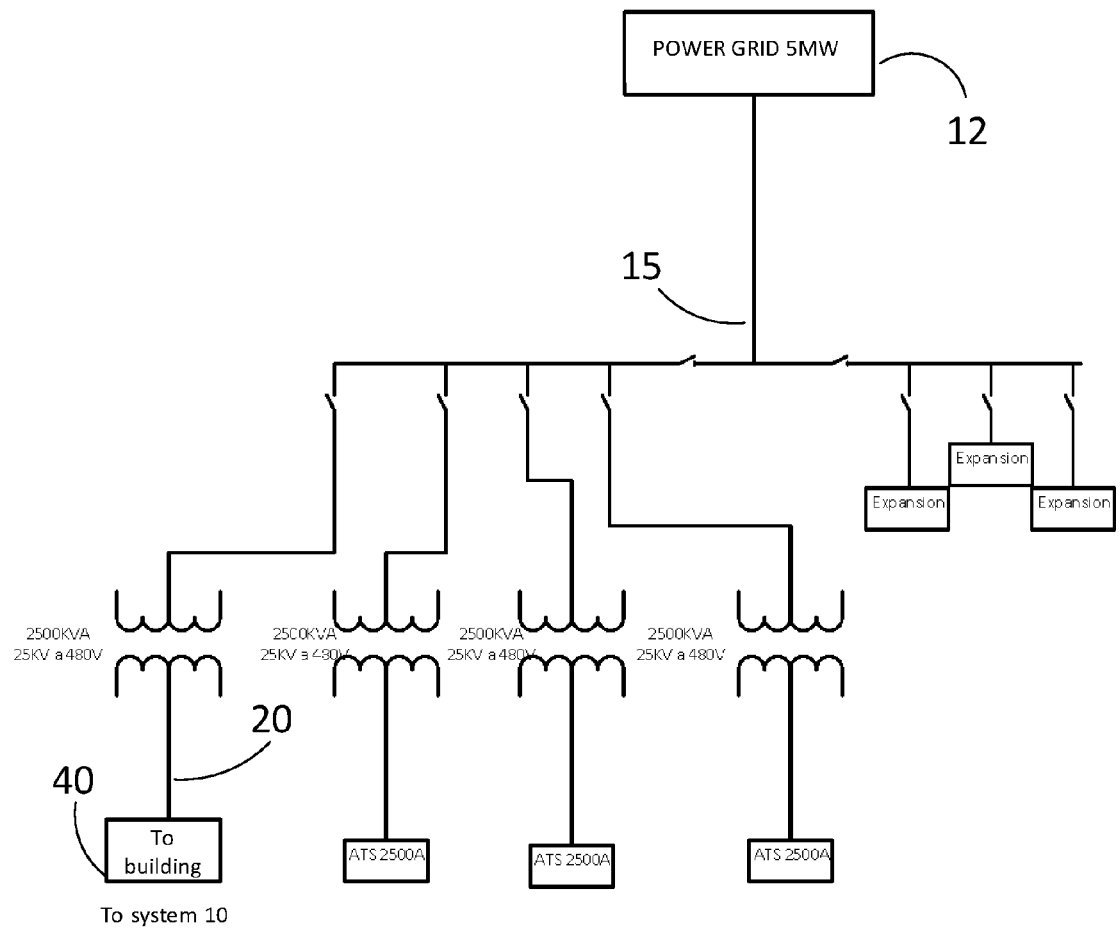
FIG. 3 is a single-line diagram illustrating the system in relation with the electric power grid, according to an embodiment.

FIG. 3 is an example of the connection between the system 10 and the electric power grid 15. The grid power source 12 is shown, as well as the transformation of the high-voltage electric power into a lower voltage adapted for distribution (e.g., a 25 kV to 480V transformation). As seen in FIG. 3, a power source 20 can be assimilated to the cable from the power grid to which the system 10 is connected.

FIG. 4 shows an example of a load of the system 10. Each pair of transformers of the group of transformers 55a, 55b, 55c, 55d intended to supply the electrical panels is connected to a load. According to an embodiment shown in FIG. 4, the load, or the electrical panel, comprises a plurality of panels, e.g., 18 panels of 42 breakers each. In this example, each breaker has a rating current of 400 A and the electrical panel is in a two-pole configuration.

The system described above advantageously requires only N+1 power sources and N+1 UPS units to supply the panels. Only electrical distribution (i.e., transformers) exhibits 2N redundancy. The required capital investment required to provide redundancy is thus reduced compared to existing systems that need 2N redundancy at all levels.

Moreover, the system described above advantageously makes use of all power sources. Redundant power sources are not unused batteries waiting for an emergency. Redundancy is rather provided by coupling active power sources so that they can be used to supply any UPS unit. Normal operation involves all power sources, so that no power source is in standby during normal operation. Alternatively, the power source to be used can be selected. For example, the power source 20a can be selected to provide electric power to UPS unit 20c, which can be used to power the two loads shown in FIG. 1. The power source and the UPS to be used are independent and can be selected accordingly. Even though electrical paths can be segregated when synchronization problems occur (for safety purposes), during normal operation, any generator can feed any UPS which can feed any load. An arbitrary selection of these elements can therefore be used during normal operation.

Furthermore, the coupling between power sources 20a, 20b, 20c and the coupling between UPS units 30a, 30b, 30c ensures maximum redundancy with the minimum equipment. All UPS units 30a, 30b, 30c will be operable if one of the power sources 20a, 20b, 20c fails, and all panels will be powered if one of the UPS units 30a, 30b, 30c fails.

Finally, the system 10 can advantageously be provided as a centralized system to which electrical panels 50a, 50b are electrically connected. Instead of providing a plurality of modules (each one of the modules having a battery to provide redundancy), which are dispersed in the facility and harder to maintain, the whole system is centralized as a single system, easier to maintain, comprising busbars, switchgears, ATSs, breakers and connectors to the power sources and to the electrical panels.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for redundantly supplying power to electrical panels, the system comprising:
   N+1 input electrical connections to power sources for receiving power therefrom;
   N+1 UPS units, each one of the N+1 UPS units having an electrical connection to each one of the N+1 input electrical connections; and
   N electrical panels to which power is supplied, each one of the electrical panels having electrical connections to a combination of two UPS units, whereby each one of the N+1 UPS units has at least N electrical connections to the electrical panels,
   wherein each one of the UPS units has a dedicated one of the input electrical connections, the electrical connection between each one of the UPS units and the dedicated one of the input electrical connections comprising a switchgear having a first current rating.

2. The system of claim 1, wherein the electrical connection between each one of the UPS units and the N+1 input electrical connections others than the dedicated one comprises a switchgear having a second current rating greater than the first current rating.

3. The system of claim 1, further comprising a utility electrical panel having an electrical connection to each one of the N+1 input electrical connections, the utility electrical panel having two dedicated input electrical connections, the electrical connection between the utility electrical panel and the two dedicated input electrical connections comprising a switchgear having the first current rating.

4. The system of claim 1, wherein the electrical connection between the UPS units and the input electrical connections comprises a blockbar.

5. The system of claim 1, wherein each one of the input electrical connections comprises an automatic transfer switch (ATS).

6. A power supply system for a data center, the power supply system comprising:
   N+1 inputs for receiving power from a bank of N+1 power sources;
   a bank of N+1 UPS units, each one having an electrical connection to each one of the N+1 inputs and being protected therefrom by a dedicated switchgear;
   2N power outputs to supply the data center, each one of the 2N power outputs being connected to two of the N+1 UPS units; and
   segregating switchgears, located such that any electrical path between the dedicated switchgear of two N+1 UPS units comprises at least one of the segregating switchgears,
   wherein each dedicated switchgear has a first current rating, each segregating switchgear having a second current rating greater than the first current rating.

7. The power supply system of claim 6, wherein the electrical connection between the UPS units and the inputs comprises a blockbar.

8. The power supply system of claim 6, wherein each one of the inputs comprises an automatic transfer switch (ATS).

9. The power supply system of claim 6, further comprising a utility electrical panel having an electrical connection to each one of the N+1 inputs, the utility electrical panel having two dedicated inputs, the electrical connection between the utility electrical panel and the two dedicated inputs comprising a switchgear having the first current rating.

10. A circuit to supply electric power to N electrical panels, the circuit comprising:
    N+1 blockbars, each one of the blockbars being for connection to an automatic transfer switch (ATS) of a power source, each one of the blockbars being connected to at least two other ones of the N+1 blockbars via a segregating switchgear;
    N+1 UPS units, each one of the UPS units being for connection to a dedicated one of the blockbars via a dedicated switchgear; and
    2N power outputs, each one of the N electrical panels being connected to 2 of the 2N power outputs, each one of the 2N power outputs being connected to 2 of the N+1 UPS units,
    wherein each dedicated switchgear has a first current rating, each segregating switchgear having a second current rating greater than the first current rating.

11. The circuit of claim 10, further comprising a utility electrical panel having an electrical connection to each one of the N+1 blockbars, the utility electrical panel having two dedicated blockbars, the electrical connection between the utility electrical panel and the two dedicated blockbars comprising a switchgear having the first current rating.

* * * * *